(12) United States Patent
Bart et al.

(10) Patent No.: US 8,706,660 B2
(45) Date of Patent: Apr. 22, 2014

(54) SYSTEM AND METHOD FOR EFFICIENT INTERPRETATION OF NATURAL IMAGES AND DOCUMENT IMAGES IN TERMS OF OBJECTS AND THEIR PARTS

(75) Inventors: Evgeniy Bart, Sunnyvale, CA (US); Prateek Sarkar, Sunnyvale, CA (US); John T. Maxwell, III, Santa Clara, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 328 days.

(21) Appl. No.: 13/022,952

(22) Filed: Feb. 8, 2011

(65) Prior Publication Data

US 2012/0203721 A1     Aug. 9, 2012

(51) Int. Cl.
*G06N 3/12* (2006.01)

(52) U.S. Cl.
USPC .......................................................... 706/13

(58) Field of Classification Search
USPC .............................................................. 703/2
See application file for complete search history.

(56) References Cited

U.S. PATENT DOCUMENTS

| | | | | |
|---|---|---|---|---|
| 6,327,388 | B1 * | 12/2001 | Zhou et al. | 382/204 |
| 7,224,836 | B2 * | 5/2007 | Sarkar | 382/228 |
| 2007/0280530 | A1 | 12/2007 | Fung et al. | |
| 2010/0253967 | A1 | 10/2010 | Privault et al. | |
| 2011/0078191 | A1 | 3/2011 | Ragnet et al. | |
| 2011/0280451 | A1 * | 11/2011 | Sarkar | 382/112 |
| 2011/0293187 | A1 * | 12/2011 | Sarkar et al. | 382/190 |

OTHER PUBLICATIONS

Bart E., et al., "Information extraction by finding repeated structure", DAS '10, Jun. 9-11, 2010, Boston, MA, USA, pp. 175-182.*
Bart E., "Parsing tables by probabilistic modeling of perceptual cues", 2012 10th IAPR International Workshop on Document Analysis Systems, pp. 409-414.*
Gupta M., et al., "A Shared Parts Model for Document Image Recognition", Document Analysis and Recognition, ICDAR 2007, Ninth International Conference, vol. 2, IEEE, 2007.*
Hamza H., et al., "A Case-Based Reasoning Approach for Unknown Class Invoice Processing", ICIP 2007, IEEE, 2007.*
Y. Belaïd and A. Belaïd. Morphological tagging approach in document analysis of invoices. In ICPR, 2004.
C. Chow and C. Liu. Approximating discrete probability distributions with dependence trees. Information Theory, 14(11):462-467, 1968.
R. Fergus, P. Perona, and A. Zisserman. Object class recognition by unsupervised scale-invariant learning. In CVPR, Jun. 2003.
N. Friedman, D. Geiger, and M. Goldszmidt. Bayesian network classifiers. Machine Learning, 29:131-163, 1997.

(Continued)

*Primary Examiner* — Jeffrey A Gaffin
*Assistant Examiner* — Dave Misir
(74) *Attorney, Agent, or Firm* — Fay Sharpe LLP

(57) ABSTRACT

Methods and system employing the same for optimizing an objective function are provided. The objective function assesses the quality of a candidate solution. One or more variables of an objective function are selected as pivot variables. Each of the variables include one or more candidate values. An upper bound function is generated from the objective function, where the pivot variables are held fixed. For each combination of the candidate values, one or more candidate solutions are searched using the upper bound function. One or more optimal solutions are selected from among the solutions to the searches.

32 Claims, 5 Drawing Sheets

(56) References Cited

OTHER PUBLICATIONS

H. Hamza, Y. Belaïd, and A. Belaïd. Case-based reasoning for invoice analysis and recognition. In Proceedings of the 7th International conference on Case-Based Reasoning, 2007.

T. Hassan. User-guided wrapping of pdf documents using graph matching techniques. In ICDAR, 2009.

B. Klein, S. Agne, and A. Dengel. Results of a study on invoice-reading systems in Germany. In DAS, 2004.

B. Klein, S. Gokkus, T. Kieninger, and A. Dengel. Three approaches to "industrial" table spotting. In ICDAR, 2001

P. Sarkar and E. Saund. Perceptual organization in semantic role labeling. In Proceedings of 2005 Symposium on Document Image Understanding Technology, 2005.

P. Sarkar and E. Saund. On the reading of tables of contents. In DAS, 2008.

M. Weber, M. Welling, and P. Perona. Towards automatic discovery of object categories. In CVPR, 2000.

Silva, et al., "Design—tables.", IJODA&R 10.1007/s10032-005-0001-x, 2006, pp. 144-171.

* cited by examiner

SYSTEM AND METHOD FOR EFFICIENT INTERPRETATION OF NATURAL IMAGES AND DOCUMENT IMAGES IN TERMS OF OBJECTS AND THEIR PARTS

BACKGROUND

The present exemplary embodiments relate generally to search optimization. They find particular application in conjunction with document processing and/or image processing, and will be described with particular reference thereto. However, it is to be appreciated that the present exemplary embodiments are also amenable to other like applications.

Many problems can be solved by formulating an objective function and then optimizing that function. Optimization generally includes searching a set of candidate solutions for one or more candidate solutions having best values of the objective function. Examples of problems that can be solved in this way include, but are not limited to, object localization, object detection, image categorization, invoice parsing, repeated structure finding, and the like.

Object localization generally seeks to find a known specific object, or any object of a known object category (e.g., a face or a car), and/or one or more individual parts of that object within an image. Object detection generally seeks to detect whether an image contains a known object. Image categorization generally seeks to assign category labels to images based on their content. Invoice parsing generally seeks to extract individual line items from an invoice. Repeated structure finding generally seeks to find instances of repeated structure (e.g., a set of fields that form one line item of an invoice or a set of features that form a face) given one or more instances of structure of interest.

Existing search methods, both general, such as A*, and specific, such as those for a particular model, are often not efficient enough to handle certain problems. This is common with relatively small problems that need to be solved quickly (e.g., in real time) and large and/or complex problems. To improve efficiency and reduce failures, several workarounds are available.

A typical workaround includes modifying a problem's objective function in such a way that optimization becomes easier. For example, a problem's objective function may be modified to assume independence between all or some of the variables involved. In this case, the problem might separate into several independent sub-problems, which allows for more efficient optimization. However, a drawback of such modifications and/or simplifications is that in many cases it compromises the quality of the solution. While this may be acceptable in certain situations, such as when the original problem cannot be solved at all using existing methods, it is not optimal.

Another typical workaround that can be used is artificially restricting the maximal allowable problem size to a limit that existing search algorithms can handle. For example, in a consumer application, a limit may be set on the maximal size of images that can be processed or on the maximal number of fields per invoice that can be located. However, these restrictions may be too limiting for end users.

The present disclosure contemplates new and improved systems and/or methods for remedying these, and other, problems.

BRIEF DESCRIPTION

Various details of the present disclosure are hereinafter summarized to provide a basic understanding. This summary is not an extensive overview of the disclosure and is intended neither to identify certain elements of the disclosure, nor to delineate the scope thereof. Rather, the primary purpose of the summary is to present certain concepts of the disclosure in a simplified form prior to the more detailed description that is presented hereinafter.

According to one aspect of the present disclosure, a search method for optimizing an objective function, and an optimization system employing the same, are provided. One or more variables of an objective function are selected as pivot variables. Each of the pivot variables includes one or more candidate values. A series of sub-problems is constructed. These sub-problems are obtained from the original problem by holding the pivot variables fixed in the objective function. Each combination of possible values of the pivot variables corresponds to one sub-problem. One or more optima are found for each sub-problem, and one or more optima of the original problem are selected among those. To solve each sub-problem, an upper bound function is generated from the objective function for that sub-problem. An efficient search algorithm using this upper bound is then used to solve the problem efficiently. This method is particularly useful when the upper bounds for the sub-problems are tighter than the upper bound for the original problem. Since the efficiency of the search algorithm may depend on the tightness of the upper bound, the proposed algorithm may be more efficient despite the fact that it solves more individual problems.

According to another aspect of the present disclosure, a document processing system for finding repeated structure for data extraction from document images is provided. The system includes an imaging device and/or a document conversion system that converts documents into document images. The system further includes a data extraction system that extracts repeated structure from the document images using a probabilistic model for cue integration. The data extraction system includes an optimization module that optimizes an objective function embodying the probabilistic model to find one or more best candidate records from one or more candidate records of the document images. The optimization module selects one or more reference fields of a reference record as one or more pivot fields; generates an upper bound function from the probabilistic model, where the pivot fields are held fixed; loops over all combinations of candidate fields of the pivot fields while searching one or more candidate records using the upper bound function, where instances of the pivot fields in the upper bound function are substituted with a different combination for each iteration; and selects one or more best candidate records from search results.

INCORPORATION BY REFERENCE

U.S. patent application Ser. No. 13/022,877 for "Finding Repeated Structure for Data Extraction from Document Images," by Bart et al., filed on an even date herewith, and U.S. patent application Ser. No. 12/788,852 for "System and Method for Efficient Interpretation of Images in Terms of Objects and Their Parts," by Sarkar et al., filed on May 27, 2010, are both hereby incorporated herein by reference in their entireties.

BRIEF DESCRIPTION OF THE DRAWINGS

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings, in which.

DETAILED DESCRIPTION

Figure 1:
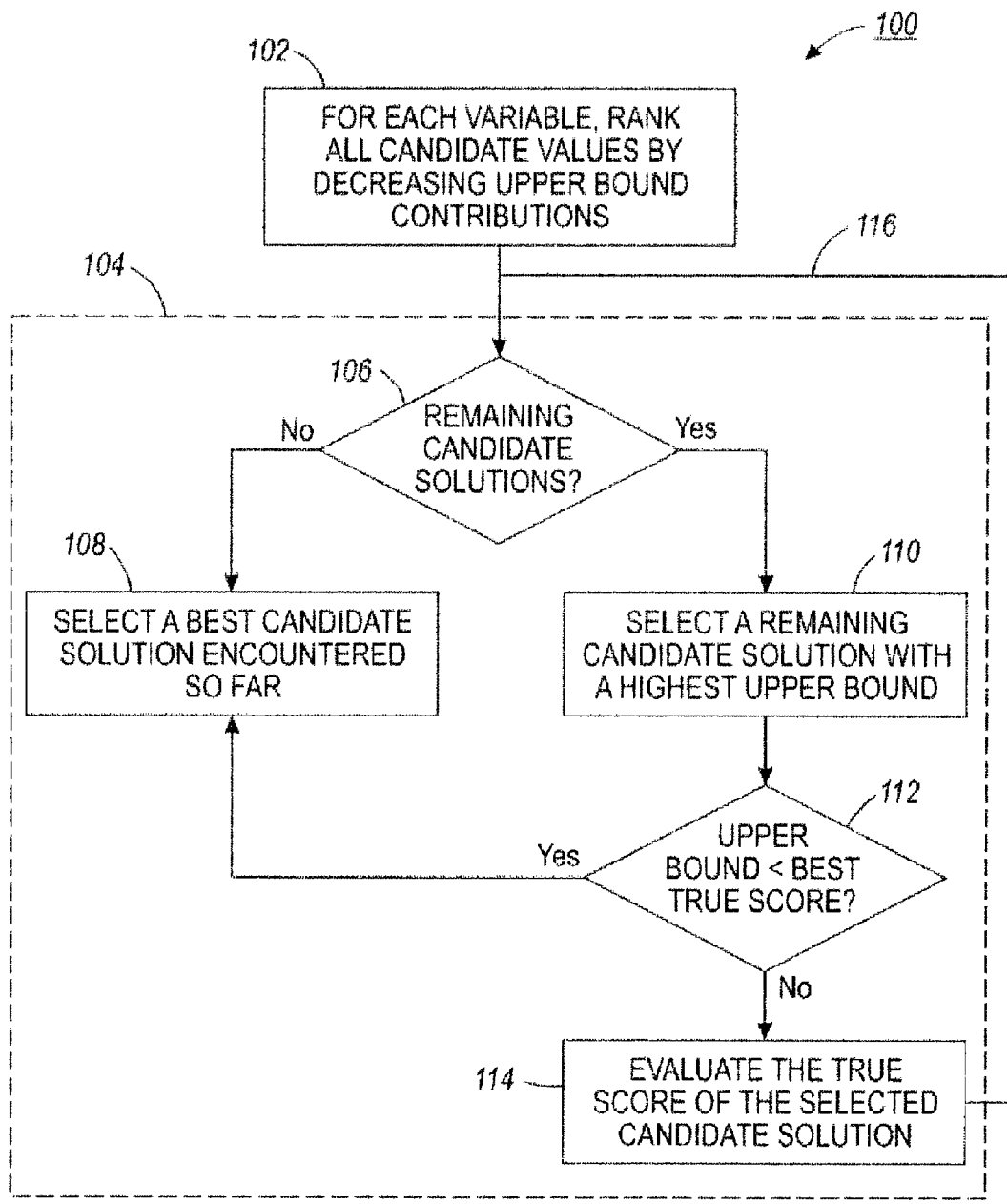
FIG. 1 is a flow chart of a method of performing a pivot search (PS) method.

One or more embodiments or implementations are hereinafter described in conjunction with the drawings, where like reference numerals are used to refer to like elements throughout, and where the various features are not necessarily drawn to scale.

1.0 OVERVIEW

The methods and systems employing the same provided herein work with a broad range of objective functions and can optimize them more efficiently than other known methods. Suitably, the methods are applied to tasks such as repeated structure finding, invoice parsing, general object localization, and the like. For concreteness and without loss of generality, it will be assumed an objective function needs to be maximized; minimization is obviously equally amenable.

As discussed in detail below, the methods and systems disclosed herein suitably use a search method called pivot search (PS). Hence, before discussing these methods and systems, PS is discussed in detail. After discussing PS, these methods and systems are discussed in detail and applied to repeated structure finding.

2.0 THE PS METHOD

With reference to FIG. 1, a search method 100 employing PS is provided. The search method 100 presupposes one or more candidate solutions to search, an objective function $L(\{B_i\}_{i=1}^n)$ for evaluating the quality of a candidate solution, and an upper bound function $U(\{B_i\}_{i=1}^n)$ for evaluating the upper bound of the quality of a candidate solution.

A candidate solution is suitably comprised of n values, where n corresponds to the number of variables of the objective function. Each variable of the objective function suitably includes one or more candidate values. Further, each value of a candidate solution suitably corresponds to a candidate value of a different variable of the objective function. In certain embodiments, the candidate solutions may include every possible candidate solution that may be derived from the candidate values of the variables of the objective function.

The objective function $L(\{B_i\}_{i=1}^n)$ evaluates the quality of a candidate solution. The quality of a candidate solution is hereafter referred to as its true score. An example of an objective function, which will be used for illustrative purposes throughout the proceeding discussion, is as follows:

$$L(\{B_i\}_{i=1}^n) = \sum_{i \in [1 \ldots n]} f_1(B_i) + \sum_{\substack{i,j \in [1 \ldots n] \\ i \neq j}} f_2(B_i, B_j) + f_n(\{B_i\}_{i=1}^n). \quad (1)$$

$\{B_i\}_{i=1}^n$ are the variables to be optimized over, and $f()$ are known functions. The function subscripts indicate how many variables the corresponding function depends on.

The upper bound function $U(\{B_i\}_{i=1}^n)$ provides an upper bound on the true score of a candidate solution. The upper bound function must be factorizable, such that it may be represented as $$U(\{B_i\}_{i=1}^n) = \sum_i u_i(B_i). \quad (2)$$

For example, the upper bound function of the objective function of Equation (1) may be expressed as $$U(\{B_i\}_{i=1}^n) = \sum_{i \in [1 \ldots n]} f_1(B_i), \quad (3)$$

so long as the functions $f_2$ and $f_n$ are always non-positive.

To compensate for situations in which an objective function includes functions that are not always non-positive, these functions can be modified by subtracting from each function the largest value of that function:

$$\bar{f}_i(x) = f_i(x) - \max_t f_i(t). \quad (4)$$

This is possible, for example, if the set of candidate values for each variable is finite. Subtracting the maximum value from each $f$ only changes L by a constant. Since a goal is to find the candidate solution that maximizes the function, this change is irrelevant. If the maximum value of L is also of interest, it can easily be computed by evaluating the original L at the found maxima.

In view of this, the search method 100 may include one or more of ranking 102 all candidate values for each variable of the objective function by decreasing upper bound contribution and examining 104 candidate solutions in order of decreasing upper bound until the true score of a best candidate solution examined so far exceeds the upper bound of a next candidate solution or all the candidate solutions have been evaluated.

The ranking 102 of the candidate values by decreasing upper bound contributions for each variable of the objective function allows the examination 104 to be performed more efficiently, as will be apparent in view of the following discussion. The ranking 102 suitably includes determining an upper bound contribution $u_i(B_i)$ for each candidate value $B_i$ of each variable and ranking the candidate values for each variable by decreasing upper bound contributions. Determining such individual upper bound contributions is possible because the upper bound function is assumed to be factorizable. It is to be appreciated, that the upper bound function is dependent upon the objective function and problem specific. Hence, the upper bound function is suitably tailored to the optimization problem being solved by the method 100.

In case the number of candidate values for the i'th variable is finite, all $u_i$'s may be computed and sorted to perform the ranking. This is the usual case in most embodiments. However, note that there may be cases when the number of candidate values is infinite but nevertheless the ranking is known a priori. In these cases, the algorithm applies as well.

The examining 104 may include determining 106 whether there are remaining candidate solutions; if there are not remaining candidate solutions, selecting 108 the best candidate solution encountered so far; and if there are remaining candidate solutions, selecting 110 a remaining candidate solution with a highest upper bound from remaining candidate solutions, determining 112 whether the upper bound of the selected candidate solution is less than the true score of the best candidate solution examined so far, if the upper bound of the selected candidate solution is less than the true score of the best candidate solution examined so far, selecting 108 the best candidate solution encountered so far, and if the upper bound of the selected candidate solution is greater than or equal to the true score of the best candidate solution examined so far, evaluating 114 the true score of the selected candidate solution and repeating 116.

The determination 106 as to whether there are remaining candidate solutions may include determining whether there are candidate solutions that have not been examined. As should be appreciated, the remaining candidate solutions are those that have not been examined. In certain embodiments, the determination 106 may include storing the candidate solutions in a priority queue prioritized by the upper bounds of the candidate solutions from high to low. The priority queue may be grown on demand, and this process is made efficient by using the factorizability property of the upper bound. However, other means of ranking the candidate solutions may be employed. For more information pertaining to the priority queue, attention is directed to U.S. patent application Ser. No. 12/788,852 for "System and Method for Efficient Interpretation of Images in Terms of Objects and Their Parts," by Sarkar et al., filed on May 27, 2010, incorporated herein by reference in its entirety.

If there are no remaining candidate solutions, the method 100 may select 108 the best candidate solution encountered so far. This selected best candidate solution suitably corresponds to the solution to the problem, whereby the method 100 generally ends at this point. If there are remaining candidate solutions, the method 100 may continue.

The selection 110 of the remaining candidate solution with a highest upper bound includes selecting a most highly ranked remaining candidate solution from the candidate values. As noted above, a candidate solution is suitably comprised of n values, where n corresponds to the number of variables of the objective function. Since the candidate values for each variable are ranked by decreasing upper bound contributions, the remaining candidate solution with the highest upper bound can be selected by selecting a candidate solution comprised of the most highly ranked candidate value for each variable, where the combination of candidate values has not been selected before.

In certain embodiments, the selection 110 may include storing the candidate solutions in a priority queue prioritized by the upper bounds of the candidate solutions from high to low. The priority queue may be grown on demand, and this process is made efficient by using the factorizability property of the upper bound. This is detailed in Sarkar et al., incorporated herein by reference. However, other means of ranking the candidate solutions may be employed.

The determination 112 as to whether the upper bound of the selected candidate solution is less than the true score of the best candidate solution suitably includes directly comparing the upper bound of the selected candidate solution to the true score of the best candidate solution. However, other approaches are equally amenable.

If the upper bound of the selected candidate solution is less than the true score of the best candidate solution, the method 100 may select 108 the best candidate solution encountered so far. As noted above, this selected best candidate solution suitably corresponds to the solution to the problem, whereby the method 100 generally ends at this point. Further, as should be appreciated, notwithstanding that there may be remaining candidate solutions, this solution to the problem is optimal.

Particularly, since the upper bound of a candidate solution is the upper bound of its true score, candidate solutions having upper bounds less than the true score of the best candidate solutions need not be examined. Their true scores are guaranteed to be less than the best true score. Further, since candidate solutions are examined in order of decreasing upper bound, once a candidate solution having an upper bound less than the true score of the best candidate solution is found, the remainder of the candidate solutions need not be examined.

If the upper bound of the selected candidate solution is greater than or equal to the true score of the best candidate solutions, the method 100 may continue by evaluating 114 the true score of the selected candidate solution and repeating 116. The evaluating 114 suitably includes using an objective function, such as the objective function of Equation 1, to determine the true score for the selected candidate solution. In certain embodiments, only one candidate solution is evaluated at a time.

As should be appreciated, the method 100 described in connection with FIG. 1 only returns a single solution. However, the method 100 may be easily modified to return a predetermined number of solutions, where a user of the modified method suitably sets the predetermined number. The method 100 needs to be modified so the examination 104 of the candidate solutions continues until the true score of a worst candidate solution of a predetermined number of best candidate solutions examined so far exceeds the upper bound of a next candidate solution and the number of candidate solutions examined is greater than or equal to the predetermined number. When the modified method terminates, the solutions to the problem include the predetermined number of best candidate solutions examined so far.

3.0 THE PROPOSED SEARCH METHOD

The upper bound described above uses only the terms of the objective function that involve single variables. It effectively assumes that the variables are independent and optimizes each variable separately, thereby leaving it to the objective function to account for dependencies between variables. However, this failure to account for coupling between variables leads to poor performance. Namely, there are generally many candidate solutions that are good individually but are mutually incompatible. Since these incompatibilities do not influence the upper bound, many poor candidates will have a promising (high) value of U, whereby these poor candidates are then more likely to be considered.

To overcome this inefficiency, the upper bound may be modified as described below. First, assume that the value for one of the variables (e.g., variable p) of the objective function is fixed to be $B_p$. This variable will be called a 'pivot' below. Using Equation (1) as an example, the objective function can then be rewritten as $$L(\{B_i\}_{i=1}^n) = f_1(B_p) + \sum_{i \neq p} f_1(B_i) + \sum_{i \neq p} f_2(B_i, B_p) + \quad (5)$$

$$\sum_{j \neq p} f_2(B_p, B_j) + \sum_{\substack{i \neq j \\ i,j \neq p}} f_2(B_i, B_j) + f_n(\{B_i\}_{i=1}^n),$$

where the sums over the $f_1$ and $f_2$ terms have been split into parts that involve p and parts that do not involve p.

Since $B_p$ is fixed, terms in $f_2$ that were previously dependent upon two variables now only depend on one variable. Therefore, a new upper bound $U^p$ can be obtained:

$$U^p(\{B_i\}_{i=1}^n) = \sum_{i \neq p} f_1(B_i) + \sum_{i \neq p} f_2(B_i, B_p) + \sum_{j \neq p} f_2(B_p, B_j). \quad (6)$$

Note that $f_1(B_p)$ is constant and can be ignored. This upper bound is tighter than the one in Equation (3), since $U^p$ includes pairwise terms that involve the pivot variable p. It is therefore expected that the search problem with the pivot variable held fixed can be solved more efficiently.

Figure 2:
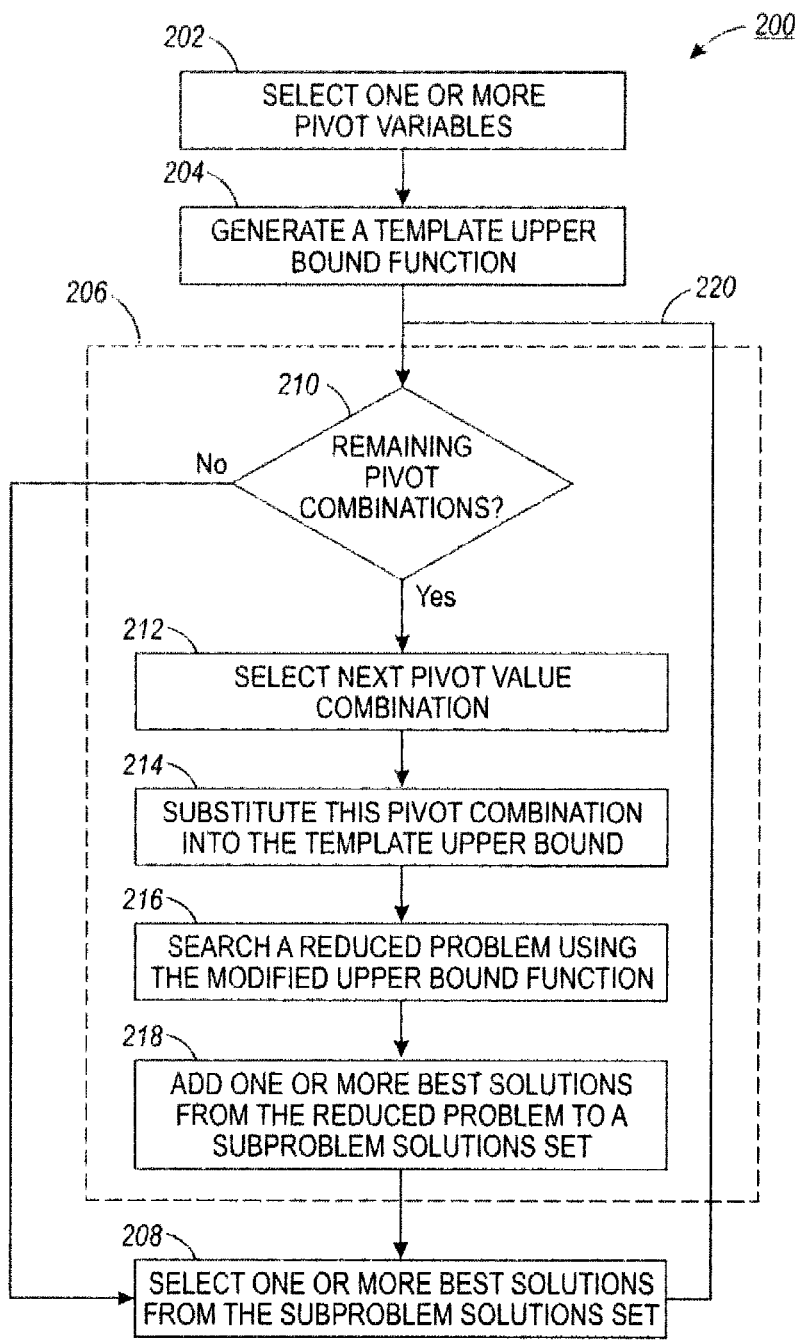
FIG. 2 is a flow chart of a search method according to the present disclosure.

With reference to FIG. 2, a search method 200 building on this modified upper bound may include selecting 202 one or more variables of the objective function as pivot variables; generating 204 a template upper bound function from the objective function; looping 206 over all possible combinations of candidate values (also known as pivot values) and, for each such combination, searching one or more candidate solutions using the template upper bound function with the current candidate values substituted; and thereafter selecting 208 one or more best solutions from the resulting solutions.

The selection 202 of the one or more pivot variables suitably includes selecting the variables with the fewest candidate values, since an optimization problem needs to be solved for every combination of candidate values. However, other means of selecting the variables are equally amenable. For example, if some variable has many candidate values, but fixing it makes the upper bound much tighter (making solving the reduced problem very efficient), selecting this variable as a pivot may be preferable. Further, the user of the method 200 suitably determines the number of pivot variables to select.

The generation 204 of the template upper bound function is suitably accomplished with involvement from a user of the method 200, but automated approaches to generating the template upper bound function are equally amenable. The generation 204 may include holding the pivot variables fixed, splitting terms of the objective function into terms involving the pivot variables and terms that do not involve the pivot variables, and removing nonfactorizable terms.

The splitting of the terms seeks to extract terms having dependencies on one variable, not including the pivot variables since they are held fixed. After splitting the terms, the terms that are dependent on more than one variable may be removed because they are nonfactorizable. Further, the terms dependent only on the pivot variables may be removed because they are constants. The remaining terms are then used as the template upper bound function. This assumes that all terms are nonpositive or can be modified to be non-positive, as described above.

The looping 206 over all possible combinations of the candidate values includes going over every combination of the candidate values that can be formed from the candidate values of the pivot variables. For n pivot variables, each combination will have n values, where each of the n values corresponds to a candidate value of a different one of the n pivot variables. Thus, for example, in embodiments in which only one variable is selected as pivot, the combinations may include the candidate values of the pivot variable. This set of combinations may be generated in advance, or may be iterated over dynamically without explicitly storing the entire set. Note that the algorithm requires going over all possible combinations of the pivot variables; this assumes, in particular, that the number of such combinations is finite, or at least that the number of candidate value combinations which may possibly be optimal is finite.

The looping 206 may include determining 210 whether there are remaining combinations of candidate values for the pivot variables; if there are remaining combinations, selecting 212 a combination of candidate values from the remaining combinations of candidate values, substituting 214 this combination into the template upper bound function, searching 216 a reduced problem using the modified upper bound function, adding 218 one or more best solutions to the reduced problem to a subproblem solutions set, and repeating 220; and if there are no remaining combinations, selecting 208 one or more best candidate solutions from the subproblem solutions set.

The determination 210 as to whether there are remaining combinations of candidate values suitably looks to whether all the combinations of candidate values have been used in a search. Naturally, if all the candidate values have been used, there are no remaining combinations of candidate values. If there are remaining combinations of candidate values, the search 208 may proceed to select 212 a combination of candidate values. If there are no remaining combinations of candidate values, the looping 206 may end and proceed to select 208 the best candidate solutions.

The selection 212 of a combination of candidate values requires no particular selection scheme. However, the combination of candidate values is suitably selected from the remaining combinations of candidate values.

The substitution 214 of the candidate values into the upper bound template function serves to complete the upper bound function, since the selected variables were merely treated as fixed while generating the upper bound function. Suitably, the generation 214 includes substituting instances of the selected variables in the upper bound function with the corresponding values of the selected combination. As should be appreciated, this defines an upper bound function unique to the selected combination.

The search 216 of the reduced problem may include selecting one or more of the candidate solutions (again, with the pivot variables fixed to the current pivot combination). The search 216 of the reduced problem may further include searching using PS and the complete upper bound function. PS may be performed, for example, as provided for in connection with FIG. 1. Note that recursive application of the proposed method, where the search 216 is performed by recursively applying the proposed method, is also possible. However, this is equivalent to selecting multiple pivot variables as disclosed above.

The selection 208 of the best candidate solution suitably includes a direct comparison of the true scores of all solutions in the subproblem solutions set. As should be appreciated, if there are P combinations of candidate values, there will P reduced problems. Note that in certain embodiments the subproblem solutions set may not be maintained explicitly; rather, the set of one or more best solutions found so far may be maintained and updated as needed.

4.0 REPEATED STRUCTURE FINDING

Figure 3:
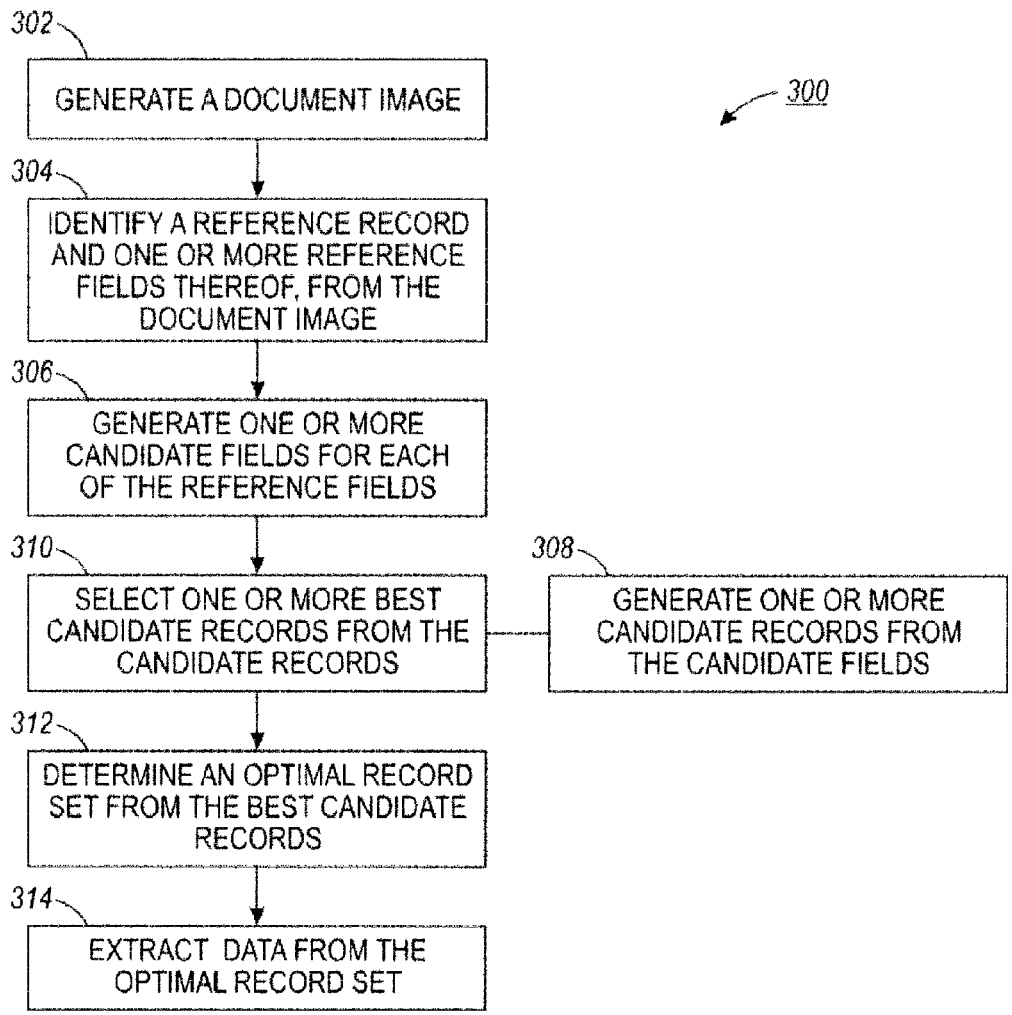
FIG. 3 is block diagram of a method of extracting repeated structure.

With reference to FIG. 3, a method 300 of extracting repeated structure from a document is illustrated. The document may be an invoice, a receipt, a healthcare document, and or other documents having repeated structure therein. Instances of repeated structure of interest are called records. Records are composed of individual fields (such as 'unit price' or 'quantity').

The method 300 may include generating 302 a document image, identifying 304 a reference record and one or more reference fields thereof, from the document image, generating 306 one or more candidate fields for each of the reference fields, selecting 310 one or more best candidate records from the candidate records (using a routine for generating candidate records from the candidate fields 308), determining 312 an optimal record set from the best candidate records, and extracting 314 data from the optimal record set. Note that the probabilistic model used in step 310 needs to be pre-trained for this process. This pre-training is described below.

The generation 302 of the document image may include converting the original incoming document representation into image form. If the original documents are hard (paper) copies, this image form can be generated using one or more of a camera, scanner, imaging device, and the like, as needed. In case the original documents are electronic (for example, in PDF format), the image form may be generated by converting it suitably to an image format. In this case, some information from the original document may be extracted and preserved for future use, in addition to the image itself. This may include, for example, the text content (if available electronically), which may subsequently be used directly instead of performing OCR on the image. The generation 302 of the document image may further include initially processing the document image. The initial processing may include deskewing, thresholding, and the like.

The identification 304 of a reference record and one or more reference fields thereof, from the document image, may include automatically identifying the reference record and the one or more reference fields. However, suitably the identification 304 includes receiving annotations from a user of the method 300.

The generation 306 of one or more candidate fields for each of the reference fields may include extracting tokens from the document image and generating all contiguous blocks of the tokens. As noted above, the tokens may be extracted by OCR (which also gives their text content) or from the original electronic document, and usually correspond to individual words or characters. These contiguous blocks may then be used as an initial pool of candidate fields for each of the reference fields.

The generation 308 of one or more candidate records from the candidate fields suitably includes generating each possible combination of the candidate fields discussed above, in an order suitable for the efficient selection 310. Put another way, the generation 308 suitably includes generating records that can be derived from the candidate fields previously determined. Note that this generation is not exhaustive; rather, candidate records are generated on demand and in an order suitable for the selection 310.

The selection 310 of the one or more best candidate records from the candidate records may include finding candidate records having a best match quality with the reference record using the search method 200 of FIG. 2. Suitably, match quality is assessed using an objective function, which includes a probabilistic model. However, other means of assessing match quality may be employed. Herein, candidate records correspond to candidate solutions, reference fields correspond to variables, and candidate fields corresponds to candidate values.

To assess a match quality of a candidate record using a probabilistic model, denote the n reference fields of a reference record R by the sequence $\{R_i\}_{i=1}^n$, and denote the n candidate fields (one candidate field for each reference field) of a candidate record B by the sequence $\{B_i\}_{i=1}^n$, where a candidate field for a reference field $R_i$ is denoted $B_i$. The match quality of a candidate record may then be evaluated by modeling the class conditional probability of the match, $$p(\{B_i\}_{i=1}^n, \{R_i\}_{i=1}^n | C). \qquad (7)$$

The class variable C may take on two values: 'match', or M, and 'no match', or $\overline{M}$.

For efficiency, the following specialized form of the model may be employed:

$$p(\{B_i\}_{i=1}^n, \{R_i\}_{i=1}^n | C) = \prod_{i \in [1 \ldots n]} s(B_i, R_i | C) * \qquad (8)$$
$$\prod_{\substack{i,j \in [1 \ldots n] \\ i \neq j}} d(B_i, B_j, R_i, R_j | C) * a(\{B_i\}_{i=1}^n, \{R_i\}_{i=1}^n | C).$$

However, in other embodiments, additional terms may be incorporated. For example, terms that involve three candidate fields may be useful to incorporate relations such as in between'.

s( ) models the probability that a candidate field $B_i$ matches a corresponding reference field $R_i$ (s stands for 'single-field criterion'); d( ) models the probability that a pair of candidate fields $B_i$, $B_j$ match a corresponding pair of reference fields $R_i$, $R_j$ (d stands for 'double-field criterion'); and a( ) models the overall match quality not modeled by the previous terms (a stands for 'all-field criterion').

The terms s( ), d( ), and a( ) may be modeled using the naive Bayes assumption, where features indicating presence or absence of a match are extracted and modeled as conditionally independent given the class. Although the naive Bayes assumption usually does not hold in practice, it often gives good results. Nonetheless, more sophisticated methods that incorporate dependencies may alternatively be employed.

Given the terms s( ) d( ) and a( ) may be modeled using the naive Bayes assumption, the log-likelihood ratio, which can be used as an objective function, can be expressed as $$L(\{B_i\}_{i=1}^n) = \log \frac{p(\{B_i\}_{i=1}^n, \{R_i\}_{i=1}^n | M)}{p(\{B_i\}_{i=1}^n, \{R_i\}_{i=1}^n | \overline{M})} \qquad (9)$$
$$= \sum_{i \in [1 \ldots n]} \sum_k w_k^s [f_k^s(B_i, R_i)] +$$
$$\sum_{\substack{i,j \in [1 \ldots n] \\ i \neq j}} \sum_k w_k^d [f_k^d(B_i, B_j, R_i, R_j)] +$$
$$\sum_k w_k^a [f_k^a(\{B_i\}_{i=1}^n, \{R_i\}_{i=1}^n)],$$

where $w_k^s$ is the weight of the s( ) feature k, and $w_k^d$ and $w_k^a$ are similar weights for the d( ) and a( ) features, respectively. These weights may be learned from training data, as described below.

Selecting a reference field as a pivot p, an upper bound $U^p$ may be defined as $$U^p(\{B_i\}_{i=1}^n) = \sum_{i \neq p} \sum_k w_k^s [f_k^s(B_i, R_i)] + \qquad (10)$$
$$\sum_{i \neq p} \sum_k w_k^d [f_k^d(B_i, B_p, R_i, R_p)] + \sum_{j \neq p} \sum_k w_k^d [f_k^d(B_p, B_j, R_p, R_j)],$$

where $B_p$ is a fixed value of the selected field. Since $B_p$ is fixed, each of the $w_k^d$ terms depends only on one of the candidate fields and this upper bound is factorizable.

The determination 312 of the optimal record set from the best candidate records may include generating one or more candidate record sets from the best candidate records and selecting the best candidate record set from the candidate record sets. A document such as an invoice may contain multiple instances of the repeated structure. All such instances may need to be identified. The set of all instances of repeated structure forms a 'record set'. In the current embodiment, the optimal candidate record may not include overlapping records and suitably accounts for more tokens than any other candidate record set. Further, of all candidate record sets that account for the same number of tokens, the set which has the highest overall quality of individual records (as measured by the sum of all the L scores) may be selected. In other embodiments, the optimality criteria may be suitably different to account for the target application.

To generate the candidate record sets, every combination of the best candidate records is suitably enumerated. However, in certain embodiments, the candidate record sets may be generated by enumerating every combination of the best candidate records having zero or one best candidate records for each of the fixed matches of the pivot field. Suitably, this prevents some candidate record sets having intersection from being considered, since two candidate records with the same fixed match will intersect at least at that fixed match. Note that other intersections may still be possible even in this case, and should be checked for separately.

To select the optimal record set, a search of the candidate record sets may be performed. Suitably, this search is a brute-force search, but other means of searching may be employed. While searching the candidate record sets, candidate record sets having any intersections (i.e., fields belong to multiple candidate record) are ignored. Further, the search suitably seeks the candidate record set explaining more tokens than any other candidate record set.

The extraction 314 of data from the optimal record set is suitably accomplished by assigning each labeled field a semantic role and by extending this semantic role to other matching fields. In such embodiments, the records of the candidate record set may be extracted to a database and/or a spreadsheet, thereby allowing efficient storage and searching thereof. It should be appreciated that in some cases OCR need not be employed. For example, images of the records may be extracted from the document images.

Prior to applying the procedure outlined above, the models should be trained. The training of the probabilistic models with one or more annotated document images seeks to learn the parameters of the probabilistic models. Specifically, the weights w used in L need to be learned. In certain embodiments, the standard learning procedure for naive Bayes models may be used. In such embodiments, a training set of document images may be employed. In each document image, one or more records need to be annotated, as described above. Suitably, if other models are used, their parameters should be trained as well.

The weight w for a feature $f$ may be learned as follows. The values of $f$ are discretized and clipped at 0 and 99. For each discretized value $f_0$, the probabilities $p(f = f_0|M)$ and $p(f = f_0|\overline{M})$ are estimated from the training data. The weight is then computed as $$w[f_0] = \log \frac{p(f = f_o | M)}{p(f = f_o | \overline{M})}. \qquad (11)$$

In certain embodiments, the training may automatically deal with irrelevant features. Suitably, this is accomplished by assigning low weights and will not influence the methods disclosed herein. It is therefore possible to specify a wide variety of features without having to verify whether these features are useful for match finding.

For more detail regarding the method 300 of FIG. 3, attention is directed to U.S. patent application Ser. No. 13/022,877 for "Finding Repeated Structure for Data Extraction from Document Images," by Bart et al., filed on an even date herewith, which is incorporated herein by reference. Further, while the method 300 of FIG. 3 focused on finding repeated structure within a single page of a document, the method 300 can be easily extended to extract repeated structure within and/or across one or more pages of one or more documents, as discussed in Bart et al., incorporated herein by reference in its entirety.

5.0 SYSTEM IMPLEMENTATION

Figure 4:
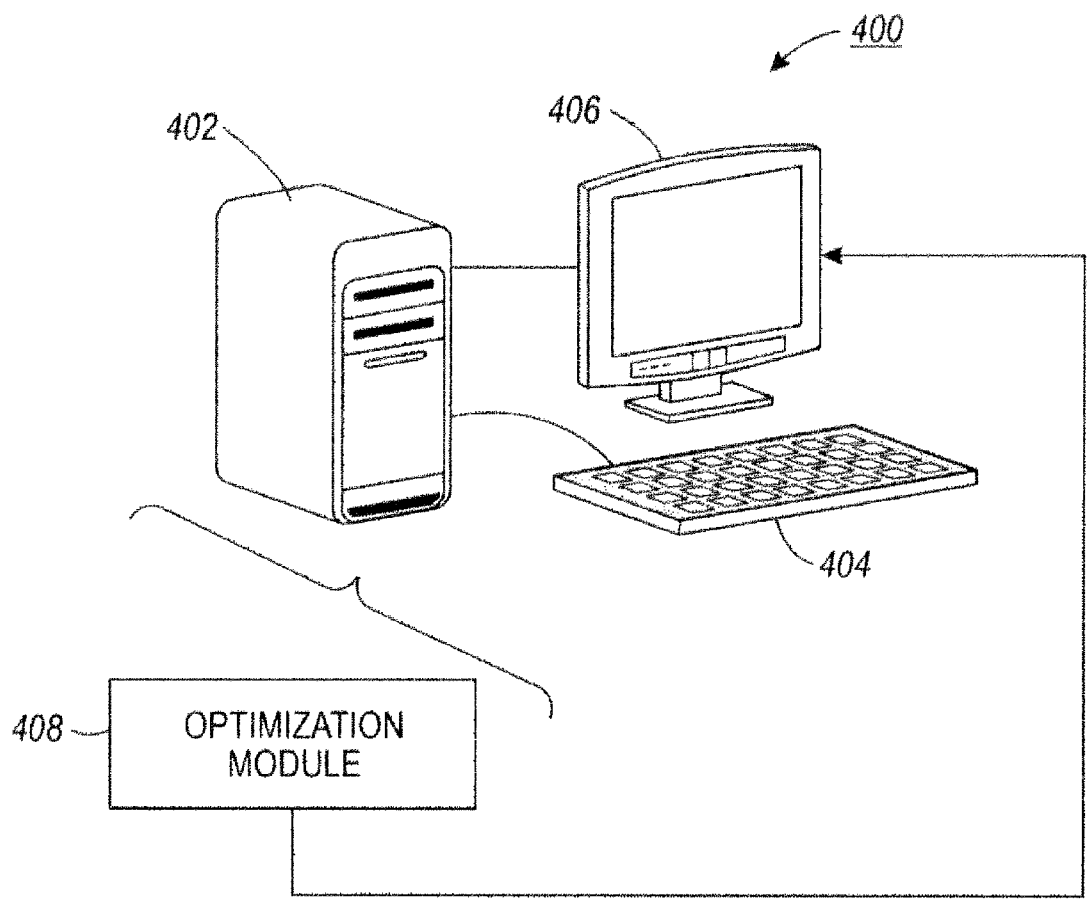
FIG. 4 is an optimization system according to the present disclosure.

With reference to FIG. 4, an optimization system 400 is provided. One or more computers or other digital/electronic processing devices 402, each including storage and a digital/electronic processor, such as a microprocessor, microcontroller, graphic processing unit (GPU), etc., suitably embody the system 400. However, in other embodiments, the system 400 may be embodied by one or more servers, each including a digital processor and each including or having access to digital data storage, such servers being suitably accessed via the Internet or a local area network, or by a personal data assistant (PDA) including a digital processor and digital data storage, or so forth.

The computers or other digital/electronic processing devices 402 suitably include or are operatively connected with one or more user input devices 404, such as a keyboard, mouse, touch screen, etc., for receiving user input to control the system 400. Further, the computers or other digital/electronic processing devices 402 suitably include or are operatively connected with one or more display devices 406, such as an LCD, a plasma display, a projector, etc., for displaying output generated by the system. In other embodiments, the input for controlling the system 400 is received from programs running on the computers or other digital/electronic processing devices 402, or from a network connection, or so forth. Similarly, in other embodiments the output may serve as input to a program running on the computers or other digital/electronic processing devices 402, or may be transmitted via a network connection, or so forth.

The system 400 suitably includes an optimization module 408 that implements one or more aspects of the methods disclosed herein. Suitably, the module 408 is provided with an objective function, and possibly also with one or more candidate solutions. Further, the module suitably outputs one or more best solutions found within the candidate solutions. In certain embodiments, the module 408 may be used to find repeated structure within one or more documents.

In some embodiments, the optimization module 408 is embodied by a storage medium storing instructions executable by the computers or other digital/electronic processing devices 402. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

Figure 5:
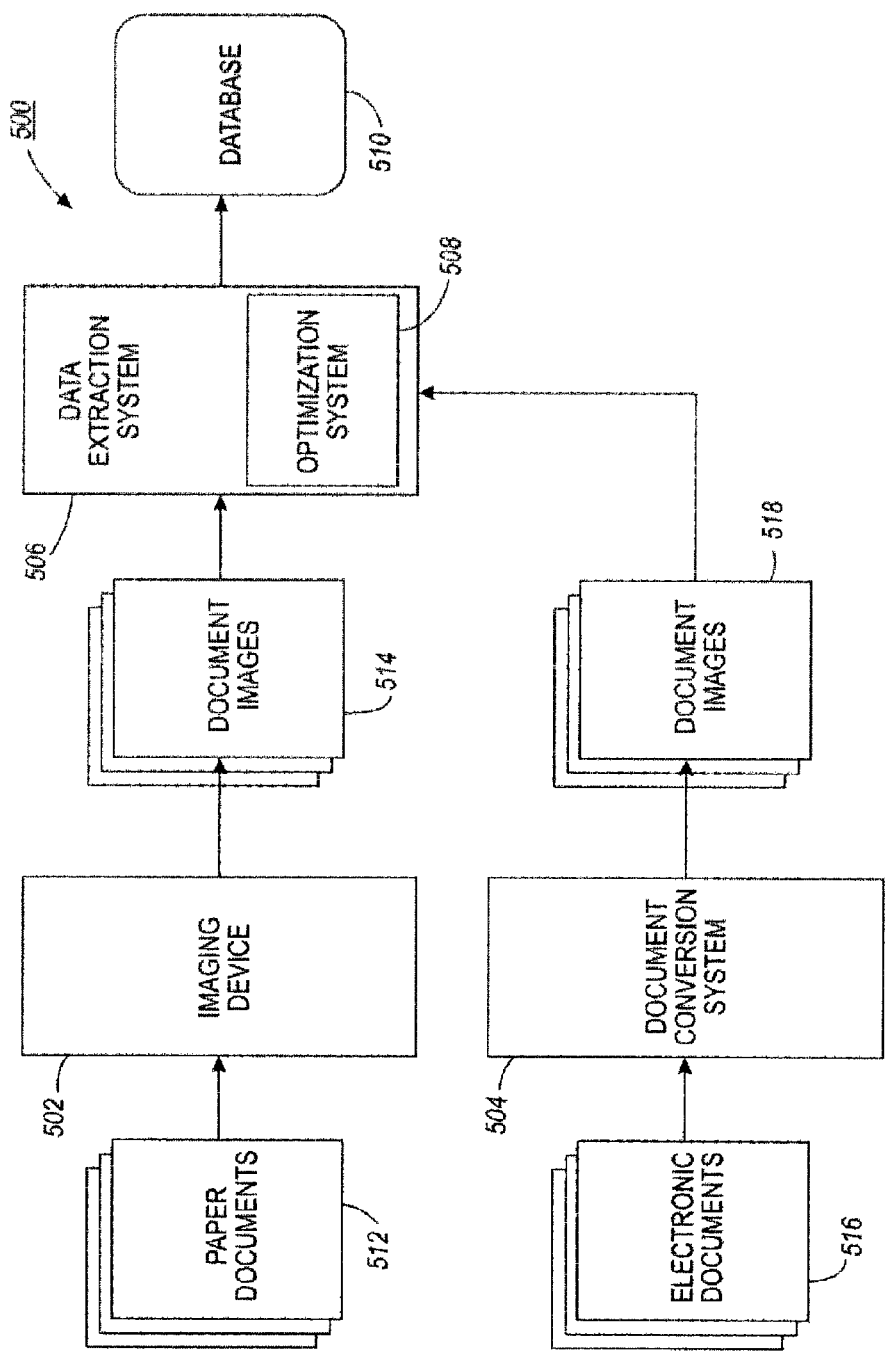
FIG. 5 is a data processing system employing an optimization system.

With reference to FIG. 5, a document processing system 500 employing an optimization system is illustrated. The document processing system 500 may include an imaging device 502, a document conversion system 504, a data extraction system 506, an optimization system 508, such as the optimization system 400 of FIG. 4, and a database 510. Notably, however, the document processing system 500 may only include one of the imaging device 502 and the document conversion system 504.

The imaging device 502 converts one or more paper documents 512 into document images 514. The imaging device 502 may be one or more of a camera, a scanner, and the like. In certain embodiments, the imaging device 502 may receive the paper documents 512 via a conveyor path extending from a feed tray. However, other means of receiving the paper documents 512 are equally amenable. For example, in certain embodiments, an operator of the document processing system 500 may feed the paper documents 512 to the imaging device 502.

The document conversion system 504 converts one or more electronic documents 516 into document images 518. Optionally, the document images 518 may include auxiliary data, such as the text content of the documents 516. Put another way, the document conversion system 504 converts the electronic documents 516 in various electronic formats (such as PDF, XML, Word, etc.) into a standardized image format, possibly with auxiliary data. The electronic documents 516 may be loaded from a magnetic or optical media or a network.

The data extraction system 506 processes the document images 514, 518 to extract data contained therein according to methods and/or approach of the present disclosure. Suitably, the data extraction system 506 may receive the document images 514, 518 via a communications network, such as the Internet, a local area network, a wireless network, and the like. However, in other embodiments, the data extraction system 406 may receive the document images 514, 518 via a data bus, such as USB, Firewire, etc., a storage medium, such as a CD, a thumb drive, etc., and the like. In certain embodiments, a computer, such as the computer 402 of FIG. 4, may embody the data extraction system 504.

The optimization system 508 is suitably included within the data extraction system 506, but may be separate from the data extraction system 506. In certain embodiments, the optimization system 508 and the data extraction system 506 communicate via a data bus, a communications network, or the like. The optimization system 508 suitably receives candidate records generated by the data extraction system 506 and an objective function. It then outputs one or more best candidate records from the candidate records, which the data extraction system 506 uses to determine an optimal record set and extract data.

The database 510 stores records extracted from the document images 514, 518. Suitably, the database 510 receives the records from the data extraction system 506 via a communications network, such as the Internet, a local area network, a wireless network, and the like. In certain embodiments, the database 510 may be distributed across a plurality of computer servers interconnected by a communications network. The database 510 suitably stores the records in a table structure having fields corresponding to the fields of the records.

6.0 CONCLUSION

The methods and systems employing the same disclosed herein improve the speed of optimization by many orders of magnitude. Consequently, previously unsolvable problems may be solved. Further, larger problems can be solved. For example, more object parts can be modeled; more fields on invoices can be localized; larger images can be processed; more candidate solutions can be considered; and so on.

The disclosure has been made with reference to preferred embodiments. Obviously, modifications and alterations will occur to others upon reading and understanding the preceding detailed description. It is intended that the preferred embodiments be construed as including all such modifications and alterations insofar as they come within the scope of the appended claims or the equivalents thereof.

The invention claimed is:

1. A search method for optimizing an objective function, wherein the objective function assesses the quality of a candidate solution, said method comprising:
   selecting one or more variables of an objective function as pivot variables wherein each of the variables include one or more candidate values;
   generating a template upper bound function from the objective function, wherein the pivot variables are held fixed;
   looping over all combinations of candidate values of the pivot variables and searching one or more candidate solutions using the template upper bound function, wherein instances of the pivot variables in the template upper bound function are substituted with a combination to generate a modified upper bound function for each iteration; and,
   selecting one or more best solutions from search results.

2. The search method of claim 1, wherein the search of the candidate solutions includes:
   generating, explicitly or implicitly, an upper bound for each of the candidate solutions using the modified upper bound function; and,
   examining the candidate solutions in order of decreasing upper bound until a true score of a worst candidate solution of a predetermined number of best candidate solutions examined so far exceeds an upper bound of a next candidate solution.

3. The search method of claim 2, wherein the generation of the template upper bound function includes:
   holding the pivot variables fixed in the objective function;
   splitting terms of the objective function into terms involving the pivot variables and terms that do not involve the pivot variables; and,
   removing nonfactorizable terms.

4. The search method of claim 2, wherein the search method is used for one of object localization, object detection, image categorization, invoice parsing, and repeated structure finding.

5. The search method of claim 2, wherein the search method is used for repeated structure finding, wherein the variables correspond to reference fields, candidate values for variable correspond to candidate fields, and candidate solutions correspond to candidate records.

6. The method of claim 2, wherein the pivot variables are those that have fewer candidate values than any other variables.

7. The method of claim 2, wherein the search of the candidate solutions uses pivot search (PS).

8. The search method of claim 1, wherein the generation of the template upper bound function includes:
holding the pivot variables fixed in the objective function;
splitting terms of the objective function into terms involving the pivot variables and terms that do not involve the pivot variables; and,
removing nonfactorizable terms.

9. The search method of claim 1, wherein the search method is used for one of object localization, object detection, image categorization, invoice parsing, and repeated structure finding.

10. The search method of claim 1, wherein the search method is used for repeated structure finding, wherein the variables correspond to reference fields, candidate values for each variable correspond to candidate fields, and candidate solutions correspond to candidate records.

11. The method of claim 1, wherein the pivot variables are those that have fewer candidate values than any other variables.

12. The method of claim 1, wherein the search of the candidate solutions uses pivot search (PS).

13. A system for optimizing an objective function, wherein the objective function assesses the quality of a candidate solution, said system comprising:
one or more non-transient storage mediums, said storage mediums including computer executable instructions that:
select one or more variables of an objective function as pivot variables, wherein each of the variables include one or more candidate values;
generate a template upper bound function from the objective function, wherein the pivot variables are held fixed;
loop over all combinations of candidate values of the pivot variables and search one or more candidate solutions using the template upper bound function, wherein instances of the pivot variables in the template upper bound function are substituted with a combination to generate a modified upper bound function for each iteration; and,
select one or more best solutions from search results; and,
one or more processors that execute the computer executable instructions.

14. The system of claim 13, wherein the search of the candidate solutions includes:
generating, explicitly or implicitly, an upper bound for each of the candidate solutions using the modified upper bound function; and,
examining the candidate solutions in order of decreasing upper bound until a true score of a worst candidate solution of a predetermined number of best candidate solutions examined so far exceeds an upper bound of a next candidate solution.

15. The system of claim 14, wherein the generation of the template upper bound function includes:
holding the selected variables fixed in the objective function;
splitting terms of the objective function into terms involving the selected variables and terms that do not involve the selected variables; and,
removing nonfactorizable terms.

16. The system of claim 14, wherein the search method is used for one of object localization, object detection, image categorization, invoice parsing, and repeated structure finding.

17. The system of claim 14, wherein the search method is used for repeated structure finding, wherein the variables correspond to reference fields, candidate values for each variable correspond to candidate fields, and candidate solutions correspond to candidate records.

18. The system of claim 14, wherein the pivot variables are those that have fewer candidate values than any other variables.

19. The system of claim 14, wherein the search of the candidate solutions uses pivot search (PS).

20. The system of claim 13, wherein the generation of the template upper bound function includes:
holding the selected variables fixed in the objective function;
splitting terms of the objective function into terms involving the selected variables and terms that do not involve the selected variables; and,
removing nonfactorizable terms.

21. The system of claim 13, wherein the search method is used for one of object localization, object detection, image categorization, invoice parsing, and repeated structure finding.

22. The system of claim 13, wherein the search method is used for repeated structure finding, wherein the variables correspond to reference fields, candidate values for each variable correspond to candidate fields, and candidate solutions correspond to candidate records.

23. The system of claim 13, wherein the pivot variables are those that have fewer candidate values than any other variables.

24. The system of claim 13, wherein the search of the candidate solutions uses pivot search (PS).

25. A document processing system for finding repeated structure for extraction from document images, said system comprising:
an imaging device and/or a document conversion system that converts documents into document images; and,
a data extraction system that extracts repeated structure from the document images using a probabilistic model for cue integration, wherein the data extraction system includes an optimization module that optimizes an objective function embodying the probabilistic model to find one or more best candidate records from one or more candidate records of the document images, wherein the optimization module:
selects one or more reference fields of a reference record as pivot fields, wherein each of the pivot fields include one or more candidate fields;
generates an upper bound function from the probabilistic model, wherein the pivot fields are held fixed;
loops over all combinations of candidate fields of the pivot fields and searches one or more candidate records using the upper bound function, wherein instances of the pivot fields in the upper bound function are substituted with a combination to generate a modified upper bound function for each iteration;
selecting one or more best candidate records from search results.

26. The system of claim 25, wherein the search of the candidate records includes:
- generating, explicitly or implicitly, an upper bound for each of the candidate records using the modified upper bound function; and,
- examining the candidate records in order of decreasing upper bound until a true score of a worst candidate record of a predetermined number of best candidate records examined so far exceeds an upper bound of a next candidate record.

27. The system of claim 26, wherein the generation of the upper bound function includes:
- holding the pivot fields fixed in the objective function;
- splitting terms of the objective function into terms involving the pivot fields and terms that do not involve the pivot fields; and,
- removing nonfactorizable terms.

28. The system of claim 26, wherein the pivot fields are those that have fewer candidate fields than any other reference field.

29. The system of claim 26, wherein the search of the candidate records uses pivot search (PS).

30. The system of claim 25, wherein the generation of the upper bound function includes:
- holding the pivot fields fixed in the objective function;
- splitting terms of the objective function into terms involving the pivot fields and terms that do not involve the pivot fields; and,
- removing nonfactorizable terms.

31. The system of claim 25, wherein the pivot fields are those that have fewer candidate fields than any other reference field.

32. The system of claim 25, wherein the search of the candidate records uses pivot search (PS).

* * * * *